(12) United States Patent
Schneck

(10) Patent No.: US 8,675,721 B1
(45) Date of Patent: Mar. 18, 2014

(54) METHOD AND APPARATUS FOR DETERMINING AND DISPLAYING THE THROUGHPUT RATE OF A MODEM

(75) Inventor: Paul B. Schneck, Bala Cynwyd, PA (US)

(73) Assignee: Rembrandt Communications, LP, Bala Cynwyd, PA (US)

( * ) Notice: Subject to any disclaimer, the term of this patent is extended or adjusted under 35 U.S.C. 154(b) by 1341 days.

(21) Appl. No.: 12/229,122

(22) Filed: Aug. 20, 2008

(51) Int. Cl.
*H04B 3/46* (2006.01)
*H04B 17/00* (2006.01)
*H04Q 1/20* (2006.01)

(52) U.S. Cl.
USPC ............................ 375/225; 375/222; 375/228

(58) Field of Classification Search
USPC .................. 375/222, 224, 225, 228
See application file for complete search history.

(56) References Cited

U.S. PATENT DOCUMENTS

| 6,002,671 | A  | * | 12/1999 | Kahkoska et al. | 370/248 |
| 7,251,483 | B1 | * | 7/2007 | Alston | 455/423 |
| 8,014,314 | B1 | * | 9/2011 | Burke et al. | 370/253 |
| 2005/0135259 | A1 |   | 6/2005 | Yazdi | |
| 2009/0113045 | A1 | * | 4/2009 | Kozisek | 709/224 |
| 2011/0069619 | A1 | * | 3/2011 | Voit et al. | 370/248 |

OTHER PUBLICATIONS

NETGEAR, Reference Manual for the 54 Mbps Wireless Router WGR614 v6, Apr. 2005.*
http://www.grc.com/nat/nat.htm.*
Belkin N1 Vision Wireless Router User Manual.
Alessio Cavuoto, Luca De Vito, Gioacchino Truglia, An Instrument for Residential Gateway and Network Testing.

* cited by examiner

*Primary Examiner* — Chieh M Fan
*Assistant Examiner* — Freshteh N Aghdam
(74) *Attorney, Agent, or Firm* — Brian Gordaychik

(57) ABSTRACT

A method and apparatus for determining and displaying the throughput rate of a modem that includes a first housing, first circuitry disposed within the first housing for demodulating data received by the modem and modulating data transmitted by the modem, and a first port for outputting demodulated data from the modem and inputting data to the modem for modulating. A counting device is connected between the modem and connected equipment. The counting device includes second circuitry for monitoring traffic between second and third ports and generating the throughput rate in accordance with the monitoring. The counting device displays an indication of the throughput rate to a user of the connected equipment.

10 Claims, 4 Drawing Sheets

METHOD AND APPARATUS FOR DETERMINING AND DISPLAYING THE THROUGHPUT RATE OF A MODEM

FIELD OF THE INVENTION

The present invention relates to a method and apparatus for determining and displaying the throughput rate of a modem.

SUMMARY OF THE INVENTION

The present invention is directed to a method and apparatus for determining and displaying the throughput rate of a modem. In one embodiment, the modem includes a first housing, first circuitry disposed within the first housing for demodulating data received by the modem, and at least a first port for outputting demodulated data from the modem and inputting data to the modem for modulating.

In one embodiment, a counting device is connected between the modem and connected equipment (e.g., a personal computer or hub). The counting device displays an indication of the throughput rate of the modem to a user of the connected equipment. In one embodiment, the counting device includes: a second housing; a second port that receives demodulated data output from the first port and outputs data to the first port; a third port that outputs the demodulated data to the connected equipment, and receives data transmitted from the connected equipment; second circuitry, disposed within the second housing and connected between the second and third ports, for monitoring traffic between the second and third ports and generating the throughput rate in accordance with said monitoring; and one or more displays, coupled to an output of the second circuitry, for displaying the throughput rate to the user. The second circuitry is different from the first circuitry disposed within the first housing.

In some embodiments, one or more routers are interposed between the counting device and the connected equipment.

In some embodiments, the throughput rate corresponds to a total number of bits or packets passing through the counting device over a predetermined period of time. Alternatively, the throughput rate corresponds to a total number of bits or packets received from the modem over a predetermined period of time. In a still further alternative, the throughput rate corresponds to a total number of bits or packets received from the connected equipment over a predetermined period of time. In such embodiments, one or more switch(es) are optionally included on an exterior of the second housing. The switch(es) are coupled to the second circuitry and can be actuated by the user to vary the predetermined period of time between two or more predetermined time intervals.

Optionally, the first, second and third ports are Ethernet ports. In embodiments where such ports are Ethernet ports, the counting device optionally includes a dock with the second Ethernet port and a power connector, wherein the second Ethernet port and the power connector respectively mate with the first Ethernet port and a power coupling on the first housing when the modem is inserted into the dock.

In some embodiments, the modem is a cable modem, a FIOS modem or a modem that modulates and demodulates satellite signals; the first circuitry is implemented using one or more microprocessors, microcontrollers and/or ASICS; and the second circuitry is implemented using one or more microprocessors, microcontrollers and/or ASICS. In a specific embodiment, the second circuitry includes a counter that operates at the Protocol Layer to count packets passing through the counting device.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION OF THE INVENTION

Figure 1:
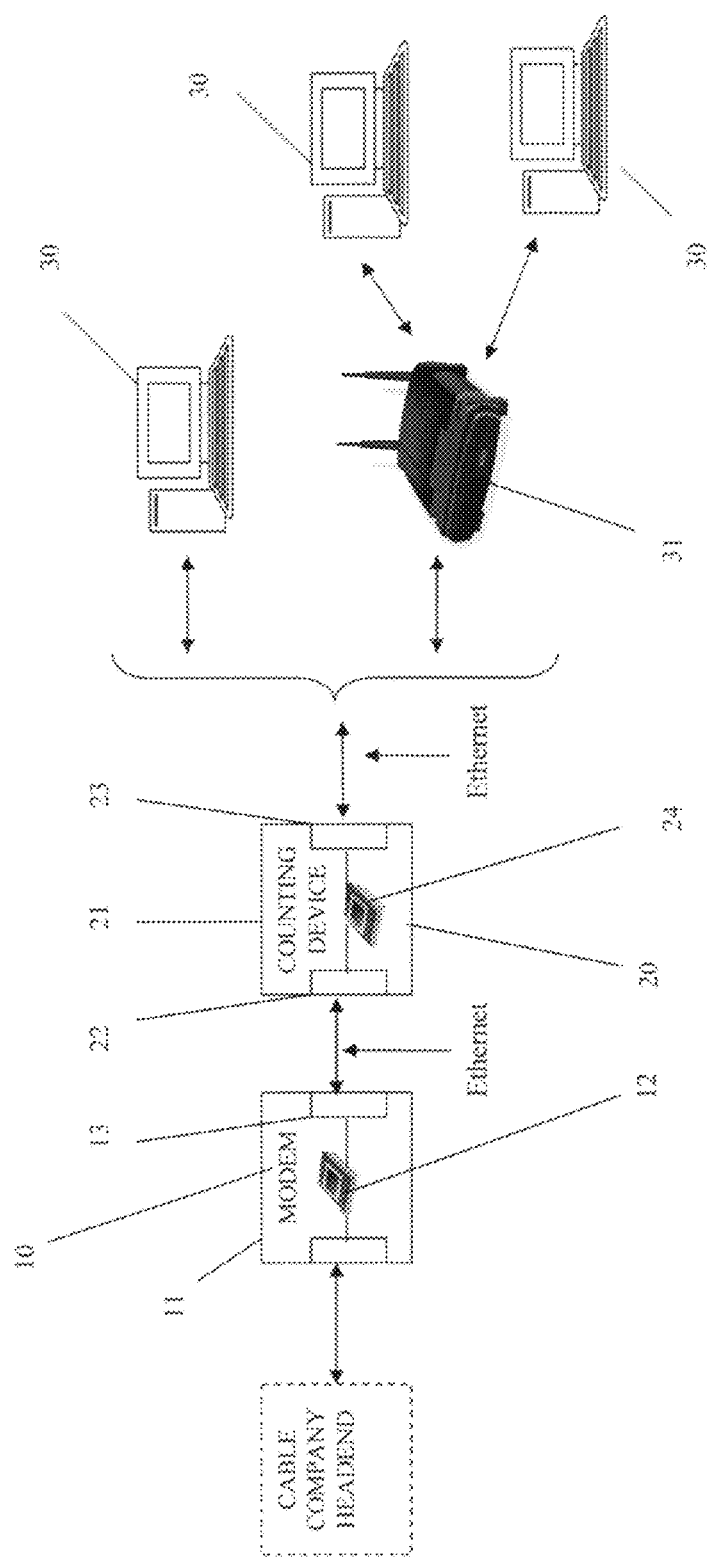
FIG. 1 is a block diagram of an apparatus for determining and displaying the throughput rate of a modem.

Referring now to FIG. 1, there is shown a block diagram of an apparatus for determining and displaying the throughput rate of a modem 10. Modem 10 is a conventional modem, such as, for example, a cable modem, a FIOS modem or a modem that modulates and demodulates satellite signals. In the embodiment of FIG. 1, modem 10 is a cable modem, and is coupled (e.g., by way of an HFC network) to a cable company headend. Modem 10 is housed in a first housing 11. Circuitry 12 (e.g., one or more microprocessors, microcontrollers and ASICS) is disposed within housing 11. In the embodiment of FIG. 1, circuitry 12 demodulates data received by modem 10 (from the cable headend) and modulates data transmitted by the modem 10 (to the cable headend). Modem 10 includes Ethernet port 13 for outputting demodulated data from 10 modem and inputting data to modem 10 for modulating.

Counting device 20 is interposed (directly or indirectly) between modem 10 and connected equipment (e.g., personal computer 30 or a hub (not shown)). Counting device 20 displays an indication of the throughput rate to a user of the connected equipment. Counting device 20 includes: a housing 21; an Ethernet port 22 that receives demodulated data output from Ethernet port 13 and outputs data to Ethernet port 13; and an Ethernet port 23 that outputs the demodulated data to the connected equipment, and receives data transmitted from the connected equipment. Counting device 20 also includes circuitry 24 (e.g., one or more microprocessors, microcontrollers and ASICS), disposed within housing 21 and connected between Ethernet ports 22 and 23, for monitoring traffic between Ethernet ports 22 and 23 and generating the throughput rate in accordance with said monitoring. Circuitry 24 is different from the circuitry 12 disposed within the housing 11. Counting device 20 also includes one or more displays 28 (shown in FIG. 3), coupled to an output of circuitry 24, for displaying the throughput rate to the user. Display 28 may display the instantaneous throughput rate as the number of bits transferred per second. Alternatively display 28 may indicate throughput as a total number of packets transferred.

As shown in FIG. 1, counting device 20 may connect directly to a piece of connected equipment (e.g., personal computer 30 or a hub (not shown)). Alternatively, as shown in FIG. 1, one or more routers 31 are interposed between counting device 20 and the connected equipment. In a still further alternative (not shown) where modem 10 is positioned between the cable headend and router 31, counting device 20 may be interposed between router 31 and a personal computer 30 (or other connected device).

Figure 2:
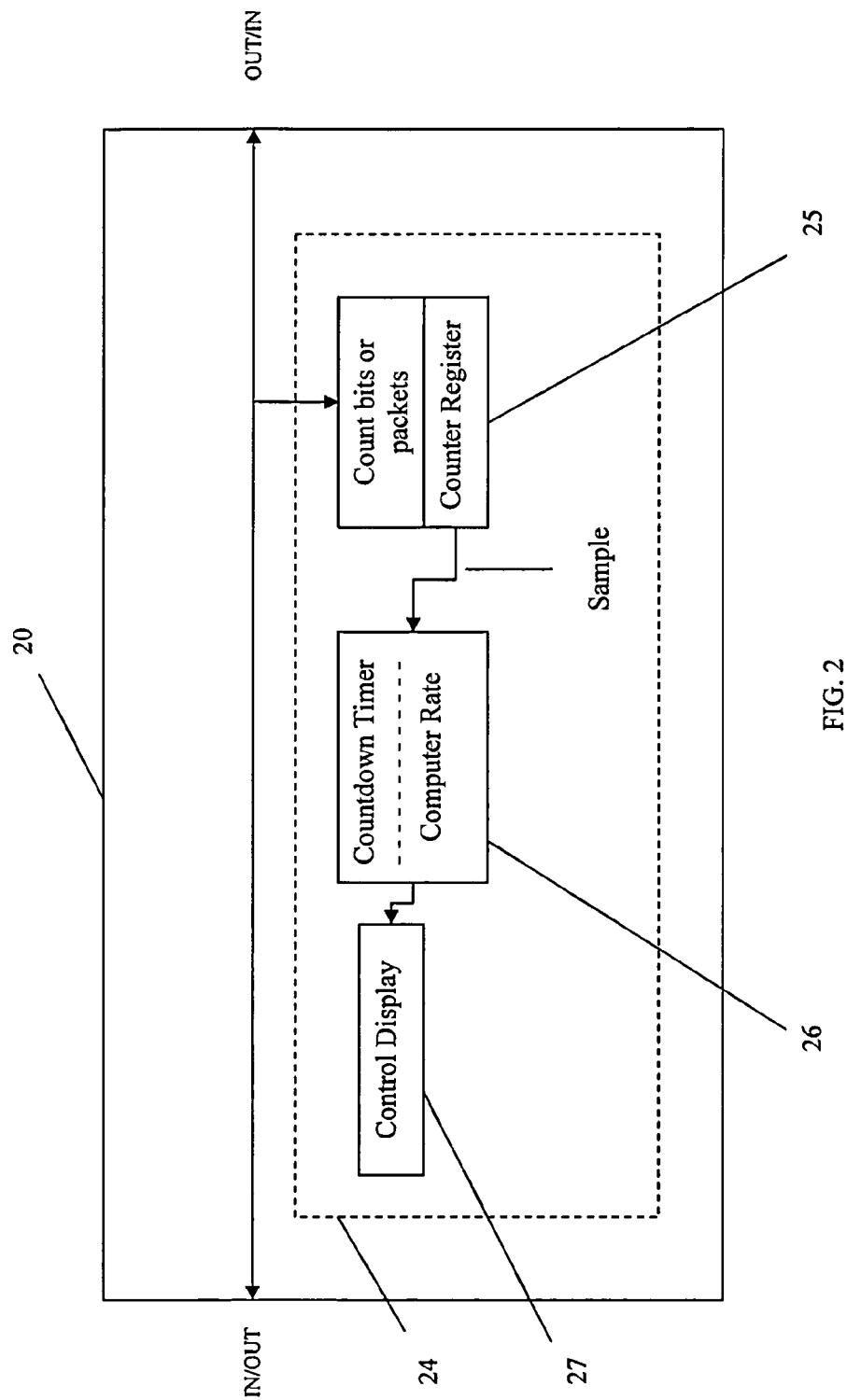
FIG. 2 is a block diagram of a counting device for monitoring traffic between Ethernet ports and generating the throughput rate in accordance with the monitoring.

FIG. 2 is a block diagram of counting device 20. In the embodiment shown, circuitry 24 (e.g., one or more microprocessors, microcontrollers and/or ASICS) includes circuitry 25 for counting bits or packets traveling in one or both directions through counting device 20 and storing the count in a counter register, circuitry 26 for periodically computing a throughput rate based on the output of the counter register, and display control circuitry 27 (coupled to the display shown in FIG. 3). In a specific embodiment, circuitry 25 operates at the Protocol Layer to count packets passing through counting device 20. In some embodiments, the throughput rate determined by circuitry 26 corresponds to a total number of bits or packets passing through counting device 20 over a predetermined period of time. Alternatively, the throughput rate determined by circuitry 26 corresponds to a total number of bits or packets received from modem 10 over a predetermined period of time. In a still further alternative, the throughput rate determined by circuitry 26 corresponds to a total number of bits or packets received from the connected equipment over a predetermined period of time. In such embodiments, at least one switch 29 (shown in FIG. 3) is optionally included on an exterior of housing 21. Switch 29 is coupled to circuitry 26 and can be actuated by the user to vary the predetermined period of time between two or more predetermined time intervals.

Figure 3:
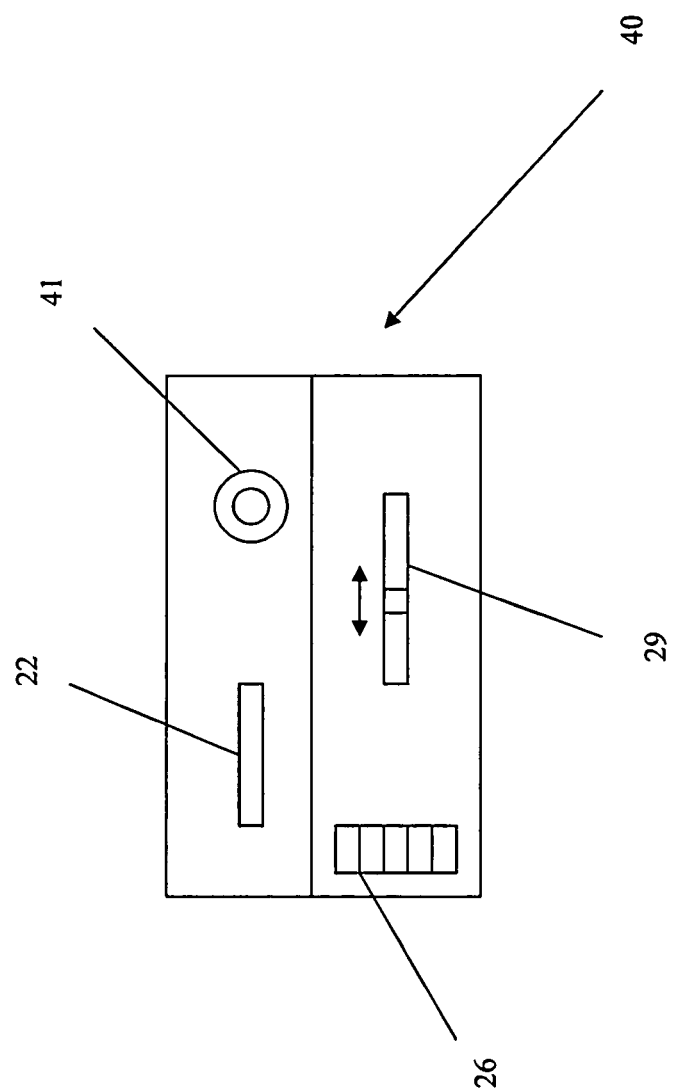
FIG. 3 shows the front view of a docking station that includes the counting device and an Ethernet port and power connector that respectively mate with an Ethernet port and a power coupling on the modem housing when the modem is inserted into the dock.
Figure 4:
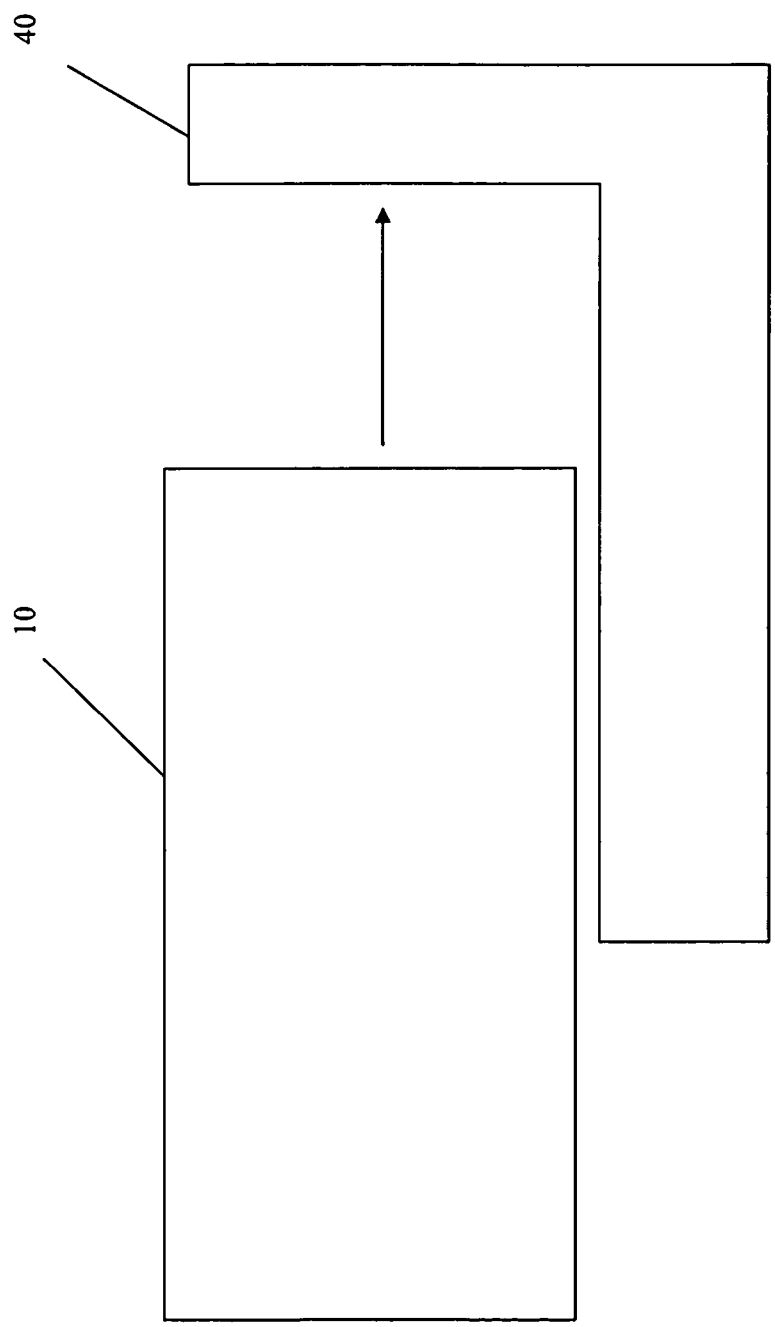
FIG. 4 shows a side view of the modem as it is being inserted into the dock.

Referring now to FIG. 3, there is shown a front view of a docking station 40 that includes counting device 20, Ethernet port 22 and power connector 41 that respectively mate with Ethernet port 13 and a power coupling (not shown) on the exterior of modem housing 11 when modem 10 is inserted into the dock (as shown in FIG. 4). It will be understood that different models of modem 10 may use different configurations for positioning Ethernet port 13 and the modem power coupling on the exterior of modem housing 11, and/or different types(s)/sizes of power connectors. In accordance with the teachings set forth above, a plurality of docketing stations with different configurations of Ethernet port 22 and connector 41 (e.g., different positions of Ethernet port 22 and power connector 41, and/or different type(s)/size(s) of power connector 41) may be developed so as to accommodate each different modem configuration.

While the invention has been described in detail and with reference to specific embodiments thereof, it will be apparent to one skilled in the art that various changes and modifications can be made therein without departing from the spirit and scope thereof. For example, while in the example set forth above ports 13, 22 and 23 are Ethernet ports, the present invention can be applied in the context of many other types of data ports (e.g., a telephone connection or a data connection to the internal bus of a PC). Thus, it is intended that the present invention cover the modifications and variations of this invention provided they come within the scope of the appended claims and their equivalents.

What is claimed is:

1. An apparatus for determining and displaying a throughput rate of a modem, wherein the modem includes a first housing, first circuitry disposed within the first housing for demodulating data received by the modem and modulating data transmitted by the modem, and at least a first port for outputting demodulated data from the modem and inputting data to the modem for modulating, comprising:
    a stand-alone counting device, connecting between the modem and a computer, for displaying an indication of the throughput rate to a user of the computer, wherein the stand-alone counting device includes:
    a second housing;
    a second port for receiving demodulated data output from the first port and outputting data to the first port;
    a third port for outputting the demodulated data to the computer, and receiving data transmitted from the computer;
    second circuitry, disposed within the second housing and connected between the second and third ports, for monitoring traffic between the second and third ports and generating the throughput rate in accordance with said monitoring; wherein the second circuitry is different from the first circuitry disposed within the first housing; and
    one or more displays, coupled to an output of the second circuitry, for displaying the throughput rate to the user;
    wherein said first port is a first Ethernet port, said second port is a second Ethernet port, and said third port is a third Ethernet port;
    wherein the stand-alone counting device further comprises a dock that includes the second Ethernet port and a power connector, wherein the second Ethernet port and the power connector respectively mate with the first Ethernet port and a power coupling on the first housing when the modem is inserted into the dock.

2. The apparatus of claim 1, wherein the modem is a cable modem, a modem coupled to an optical fiber network, or a modem that modulates and demodulates satellite signals.

3. The apparatus of claim 1, wherein the first circuitry is selected from the group consisting of microprocessors, microcontrollers and ASICS, and wherein the second circuitry is selected from the group consisting of microprocessors, microcontrollers and ASICS.

4. The apparatus of claim 1, further comprising at least one switch on an exterior of the second housing, said at least one switch being coupled to the second circuitry, wherein the at least one switch can be actuated by the user to vary a predetermined period of time for determining the throughput rate between two or more predetermined time intervals.

5. The apparatus of claim 1, wherein the second circuitry includes a counter that operates at the Protocol Layer to count packets passing through the stand-alone counting device.

6. A method for determining and displaying a throughput rate of a modem, wherein the modem includes a first housing, first circuitry disposed within the first housing for demodulating data received by the modem and modulating data transmitted by the modem, and at least a first port for outputting demodulated data from the modem and inputting data to the modem for modulating, comprising:
    connecting a stand-alone counting device between the modem and a computer, wherein the stand-alone counting device includes a second housing, a second port, a third port, second circuitry disposed with the second housing and connected between the second and third ports, and one or more displays coupled to an output of the second circuitry;
    receiving, at the second port, demodulated data output from the first port;
    outputting, from the second port, data to the first port;
    receiving, at the third port, data transmitted from the computer;
    outputting, from the third port, the demodulated data to the computer;
    monitoring traffic between the second and third ports and generating the throughput rate in accordance with said monitoring; wherein said monitoring and generating are performed by the second circuitry, and the second circuitry is different from the first circuitry disposed within the first housing; and displaying, with said one or more displays, the throughput rate to the user;

wherein said first port is a first Ethernet port, said second port is a second Ethernet port, and said third port is a third Ethernet port;

wherein the stand-alone counting device further comprises a dock that includes the second Ethernet port and a power connector, said method further comprising mating the second Ethernet port and the power connector, respectively, with the first Ethernet port and a power coupling on the first housing when the modem is inserted into the dock.

7. An apparatus including a modem with a first housing, first circuitry disposed within the first housing for demodulating data received by the modem and modulating data transmitted by the modem, and at least a first port for outputting demodulated data from the modem and inputting data to the modem for modulating, comprising:

a stand-alone counting device, connecting between the modem and a computer, for displaying information generated from a data count to a user of the computer, wherein the stand-alone counting device includes:

a second housing;

a second port for receiving demodulated data output from the first port and outputting data to the first port;

a third port for outputting the demodulated data to the computer, and receiving data transmitted from the computer;

second circuitry, disposed within the second housing and connected between the second and third ports, that generates the data count by counting traffic between the second and third ports; wherein the second circuitry is different from the first circuitry disposed within the first housing; and one or more displays, coupled to an output of the second circuitry, for displaying the information generated from the data count to the user wherein said first port is a first Ethernet port, said second port is a second Ethernet port, and said third port is a third Ethernet port;

wherein the stand-alone counting device further comprises a dock that includes the second Ethernet port and a power connector, wherein the second Ethernet port and the power connector respectively mate with the first Ethernet port and a power coupling on the first housing when the modem is inserted into the dock.

8. A method for use with a modem having a first housing, first circuitry disposed within the first housing for demodulating data received by the modem and modulating data transmitted by the modem, and at least a first port for outputting demodulated data from the modem and inputting data to the modem for modulating, comprising:

connecting a stand-alone counting device between the modem and a computer, wherein the stand-alone counting device includes a second housing, a second port, a third port, second circuitry disposed with the second housing and connected between the second and third ports, and one or more displays coupled to an output of the second circuitry;

receiving, at the second port, demodulated data output from the first port;

outputting, from the second port, data to the first port;

receiving, at the third port, data transmitted from the computer;

outputting, from the third port, the demodulated data to the computer;

generating a data count by counting traffic between the second and third ports; wherein said counting is performed by the second circuitry, and the second circuitry is different from the first circuitry disposed within the first housing; and displaying, with said one or more displays, information generated from the data count to the user wherein said first port is a first Ethernet port, said second port is a second Ethernet port, and said third port is a third Ethernet port;

wherein the stand-alone counting device further comprises a dock that includes the second Ethernet port and a power connector, said method further comprising mating the second Ethernet port and the power connector, respectively, with the first Ethernet port and a power coupling on the first housing when the modem is inserted into the dock.

9. An apparatus for determining and displaying a throughput rate of a modem, wherein the modem includes a first housing, first circuitry disposed within the first housing for demodulating data received by the modem and modulating data transmitted by the modem, and at least a first port for outputting demodulated data from the modem and inputting data to the modem for modulating, comprising:

a stand-alone counting device, connecting between the modem and a hub, for displaying an indication of the throughput rate to a user of the hub, wherein the counting device includes:

a second housing;

a second port for receiving demodulated data output from the first port and outputting data to the first port;

a third port for outputting the demodulated data to the hub, and receiving data transmitted from the hub;

second circuitry, disposed within the second housing and connected between the second and third ports, for monitoring traffic between the second and third ports and generating the throughput rate in accordance with said monitoring; wherein the second circuitry is different from the first circuitry disposed within the first housing; and one or more displays, coupled to an output of the second circuitry, for displaying the throughput rate to the user wherein said first port is a first Ethernet port, said second port is a second Ethernet port, and said third port is a third Ethernet port;

wherein the stand-alone counting device further comprises a dock that includes the second Ethernet port and a power connector, wherein the second Ethernet port and the power connector respectively mate with the first Ethernet port and a power coupling on the first housing when the modem is inserted into the dock.

10. An apparatus for determining and displaying a throughput rate of a modem, wherein the modem includes a first housing, first circuitry disposed within the first housing for demodulating data received by the modem and modulating data transmitted by the modem, and at least a first port for outputting demodulated data from the modem and inputting data to the modem for modulating, comprising:

a stand-alone counting device, connected between the modem and connected equipment, for displaying an indication of the throughput rate to a user of the connected equipment, wherein the stand-alone counting device includes:

a second housing;

a second port that receives demodulated data output from the first port and outputs data to the first port;

a third port that outputs the demodulated data to the connected equipment, and receives data transmitted from the connected equipment;

second circuitry, disposed within the second housing and connected between the second and third ports, for monitoring traffic between the second and third ports and generating the throughput rate in accordance with said monitoring; wherein the second circuitry is different from the first circuitry disposed within the first housing; and one or more displays, coupled to an output of the second circuitry, for displaying the throughput rate to the user; and wherein said first port is a first Ethernet port, said second port is a second Ethernet port, and said third port is a third Ethernet port;

wherein the counting device further comprises a dock that includes the second Ethernet port and a power connector, wherein the second Ethernet port and the power connector respectively mate with the first Ethernet port and a power coupling on the first housing when the modem is inserted into the dock.

* * * * *